United States Patent
Duranton et al.

(10) Patent No.: US 7,319,697 B2
(45) Date of Patent: Jan. 15, 2008

(54) DATA COMMUNICATION SYSTEM ACCORDING TO A PACKET-SWITCHING PRINCIPLE

(75) Inventors: Marc Duranton, Suresnes (FR); Laurent Pasquier, Asnieres-sur-Seine (FR); Valerie Rivierre, Vincennes (FR); Qin Zhao, Charenton le Pont (FR)

(73) Assignee: NXP B.V., Eindhoven (NL)

( * ) Notice: Subject to any disclaimer, the term of this patent is extended or adjusted under 35 U.S.C. 154(b) by 1029 days.

(21) Appl. No.: 10/321,201

(22) Filed: Dec. 17, 2002

(65) Prior Publication Data
US 2003/0123445 A1 Jul. 3, 2003

(30) Foreign Application Priority Data
Dec. 20, 2001 (FR) .................... 01 16575

(51) Int. Cl.
*H04L 12/28* (2006.01)
*H04L 12/56* (2006.01)
(52) U.S. Cl. .................................... 370/392
(58) Field of Classification Search ............. 370/238, 370/229, 349, 352, 389–400, 465, 537, 328; 382/240, 468, 245; 341/51, 50, 87, 63, 67; 375/240.19, 240.24; 455/428, 436; 711/201, 711/202, 1; 709/247; 358/468, 479, 442
See application file for complete search history.

(56) References Cited

U.S. PATENT DOCUMENTS

| | | | |
|---|---|---|---|
| 5,946,043 A * | 8/1999 | Lee et al. .............. | 375/240.24 |
| 6,300,888 B1 * | 10/2001 | Chen et al. ................... | 341/63 |
| 6,934,418 B2 * | 8/2005 | Okada ........................ | 382/240 |
| 6,944,349 B1 * | 9/2005 | Onno et al. ................ | 382/240 |
| 7,068,849 B2 * | 6/2006 | Zandi et al. ................ | 382/240 |
| 2003/0099293 A1 * | 5/2003 | Okada et al. .......... | 375/240.13 |

FOREIGN PATENT DOCUMENTS

EP 1081910 3/2001

\* cited by examiner

*Primary Examiner*—Wing Chan
*Assistant Examiner*—Prenell Jones

(57) ABSTRACT

The present invention relates to a communicating data system comprising devices (11, 12, 13, 14) for routing said data that are interconnected by communication links, the data being transmitted in packets and a packet comprising a header. A transmitting part of a first routing device (12) comprises first storage means suitable for storing a value of at least one parameter from said header and for transmitting a coded value corresponding thereto, and first entropy coding compression means which are suitable for recoding the uncoded value, the recoded value being stored instead of the coded value after the latter is transmitted along a communication link (15). A receiving part of a second routing device (13), that is connected to the first routing device by the communication link, comprises second storage means suitable for storing the coded value coming from the communication link (15) and for transmitting the uncoded value corresponding thereto, and second entropy coding compression means which are suitable for recoding the uncoded value, the recoded value being stored instead of the coded value.

6 Claims, 2 Drawing Sheets

DATA COMMUNICATION SYSTEM ACCORDING TO A PACKET-SWITCHING PRINCIPLE

FIELD OF THE INVENTION

The present invention relates to a data communication system comprising devices for routing said data, which devices are interconnected by communication links, the data being transmitted in packets and a packet having a header.

It also relates to a routing device suitable for transmitting or receiving data in a communication system of this kind.

Finally, it relates to a method of transmitting data between a transmitting device and a receiving device which are connected together by a communication link.

It is applicable, in particular, in communication networks that convey data on a packet-switching model.

BACKGROUND OF THE INVENTION

In a packet-switching protocol, the messages are divided into packets before being sent. Each packet is then transmitted individually and may follow different routes from a source node to a destination node of the communication network. Once all the packets forming a message have arrived at the destination, they are collected to form the original message. Most communication networks are based on packet-switching techniques. The ordinary telephone service, on the other hand, is based on a circuit-switching technique in which one line is assigned to the transmission of a message between two nodes on the network. Circuit-switching is ideal when data needs to be transmitted quickly and needs to arrive in the same order as that in which it was sent. Packet-switching is more efficient and robust for data that can tolerate a delay in transmission, such as messages of the e-mail type for example.

In a communication network based on packet-switching, a packet forms the unit entity that is transmitted, during a routing step of the message, from a transmitting node of the network to a receiving node of the network via a communication link. According to the routing method, the packets may or may not be formed into queues at each node on the network, the queues preferably being of minimum possible lengths. Each packet comprises a header and data, a header comprising:
  an address of the source node,
  an address of the destination node,
  the size of the packet, or a control word, or nothing in the case of packets of fixed size,
  a message identifier, and
  a packet identifier.

However, the header itself contributes to the size of the packet. Consequently, a message that has been divided into packets takes up more space than the original message, the effect of which is to reduce the bandwidth of the communications network.

Patent application EP 1081910 describes a method of transmitting data in packets on a communication network, said method comprising steps of compressing and decompressing the packets and, more particularly, the packet headers. In this method, the compression of the headers is performed by taking the difference between the previous packet and the current packet using error bit transmission. A receiving node is then responsible for detecting any errors in transmission. It then informs the intermediate nodes of any errors and these nodes then decide to compress or decompress the packets including the headers.

This method takes advantage of the temporal redundancy between two successive packets but may prove inefficient for certain configurations. What is more, the management of the transmission errors makes the method complicated to put into practice.

SUMMARY OF THE INVENTION

It is an object of the present invention to propose a communication system between a data transmission device and a data receiving device that is both simpler and more efficient.

To this end, the communication system according to the invention is characterized in that:
  a transmitting part of a first routing device comprises first storage means suitable for storing a value of at least one parameter from said header and for transmitting a coded value corresponding thereto, and first entropy coding compression means which are suitable for recoding the uncoded value, the recoded value being stored instead of the coded value after the latter has been transmitted along a communication link, and
  a receiving part of a second routing device, the latter being connected to the first routing device by the communication link, comprises second storage means suitable for storing the coded value coming from the communication link and for transmitting the uncoded value corresponding thereto, and second entropy coding compression means which are suitable for recoding the uncoded value, the recoded value being stored instead of the coded value.

The present invention permits to modify the entropy coding compression of the headers, at each routing device of the communication system that operates in the transmission or receiving mode, in such a way as to adapt it to a probability of said headers being present on the communication link. Hence, a packet header will be coded a plurality of times on its journey because each communication link between two devices has its own probabilities. Adaptive coding of this kind enables the efficiency with which data is transmitted to be increased in a simple way, without the addition of supplementary information, and the bandwidth of the communication network to be reduced as a result.

BRIEF DESCRIPTION OF THE DRAWINGS

These and other aspects of the invention are apparent from and will be elucidated with reference to the embodiments described hereinafter, which are given by way of non-limiting example.

In the drawings.

DESCRIPTION OF PREFERRED EMBODIMENTS OF THE INVENTION

The present invention relates to a communication system, occasionally referred to in what follows as a communication network, comprising devices for routing data messages on a packet-switching principle. These routing devices, occasionally referred to in what follows as nodes of the network are, for example, switches or processors.

The invention is based on the principle of coding the packet headers by entropy coding. This entropy coding may for example be run-length coding, Huffman coding or arithmetic coding implemented on a principle familiar to the person skilled in the art. This dynamic coding acts on at least one parameter in the header. It preferably acts on the address of the destination node, the address of the source node and the size of the packet if this size is not fixed. It is a priori less beneficial to compress the message and packet identifiers. Hence, the more frequently a packet having a predetermined header is communicated along a communication link between two nodes on the network, the more said header is coded on a small number of bits by virtue of the entropy coding. The entropy coding increases the efficiency of the communication system according to the invention as compared with the prior art because, to some degree, it makes it possible for there to be a memory effect that is not limited to the previous packet alone.

Figure 1:
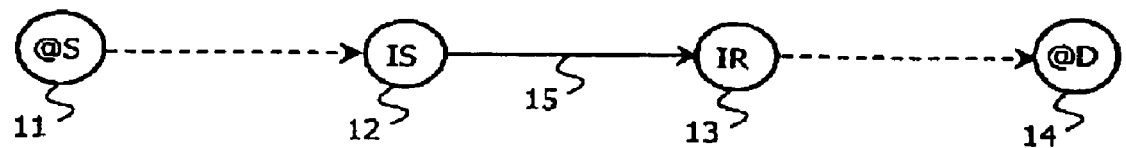
FIG. 1 shows a communication network.

To explain the embodiment of the invention, let us consider FIG. 1, which shows a simplified structure for a communication network. Said communication network comprises a source node (11) whose address is @S and which is sending a packeted message to a destination node (14) whose address is @D. Each packet in the message is transmitted individually and may follow various routes from the source node to the destination node, and certain packets may, at various times, travel from an intermediate transmitting node (12) to an intermediate receiving node IR (13) via an intermediate communication link (15). The dashed lines represent the route followed by a packet via a certain number of other intermediate nodes. The intermediate transmitting node (12) is suitable for knowing the messages that it sends along the intermediate communication link (15) and the proportion of packets in the messages whose source node address is @S, whose destination node address is @D and whose size is S. The intermediate receiving node (13) is also suitable for knowing the messages that it receives along the intermediate communication link (15) and the proportion of packets that have the characteristics specified above. For this purpose, the intermediate transmitting and receiving nodes use the same entropy coding method so that it is not necessary for any information relating to a change of coding to be transmitted. Since the method of entropy coding applies to each communications link on the network, a packet header having the characteristics specified above will be compressed with different codes depending on the frequency with which it travels along the different communication links.

Figure 2:
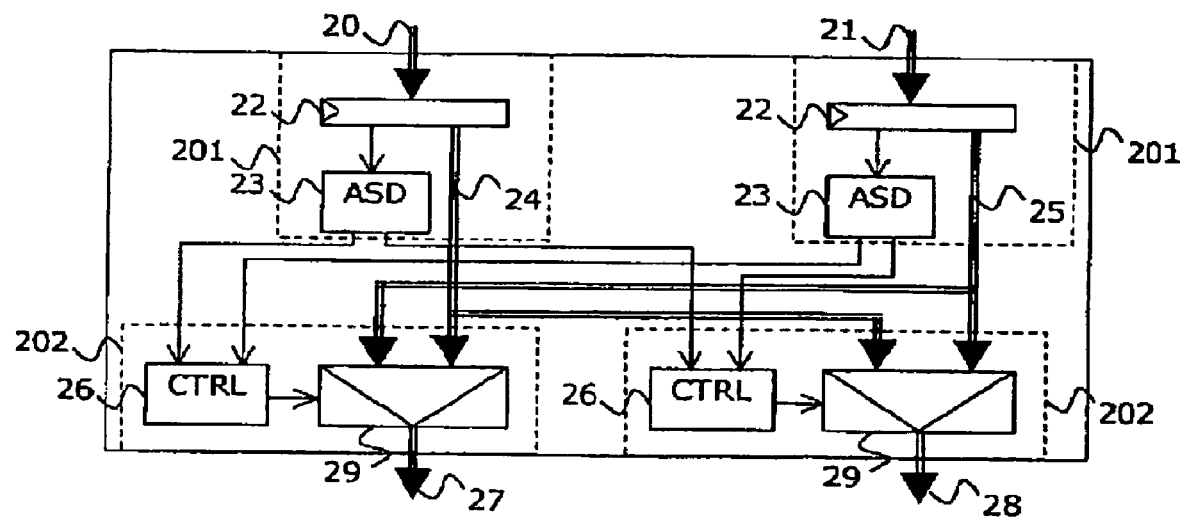
FIG. 2 shows a node of the communication network representing an embodiment of a switching device familiar to a person skilled in the art.

In a standard communication network, a routing device is generally implemented in the following way, as shown in FIG. 2. A packet arriving at one of the input ports (20, 21) of the routing device is stored in a register (22) or a queue, depending on the type of communication network. Then, the destination node address and the other relevant parameters in the header of the packet are transmitted to an address decoder ASD (23). This address decoder decodes the destination address and transmits a signal to a controller CTRL (26) controlling an output port (27, 28) that is intended to output the data packet. The items of data in the packets (24, 25), which come from the input ports (20, 21) via the register (22), are then conveyed to the inputs of multiplexers (29), each multiplexer being controlled by a controller (26) that indicates to it which input it is to select.

Where necessary, the address decoder also decodes other items of data, such as the size of the packet if the packets are not of a fixed size, in order to inform the controller of them. The controller needs the size parameter for the packets even if the packets are of fixed size, because it needs to know when a data transmission starts and when said transmission is to stop. Certain communication networks use sub-packets whose size is fixed but of which the number in a packet is not. When this is the case, the packet header contains control words that indicate whether the sub-packet is a first, a second or a last sub-packet. These control words form pieces of information required for the satisfactory operation of the controller.

Certain parameters in the packet header, such as the source node address for example, are not necessarily required at this stage. It will, however, be apparent to the person skilled in the art that those parameters in the packet header that are required and those that are not will depend on the characteristics of the network.

Figure 3:
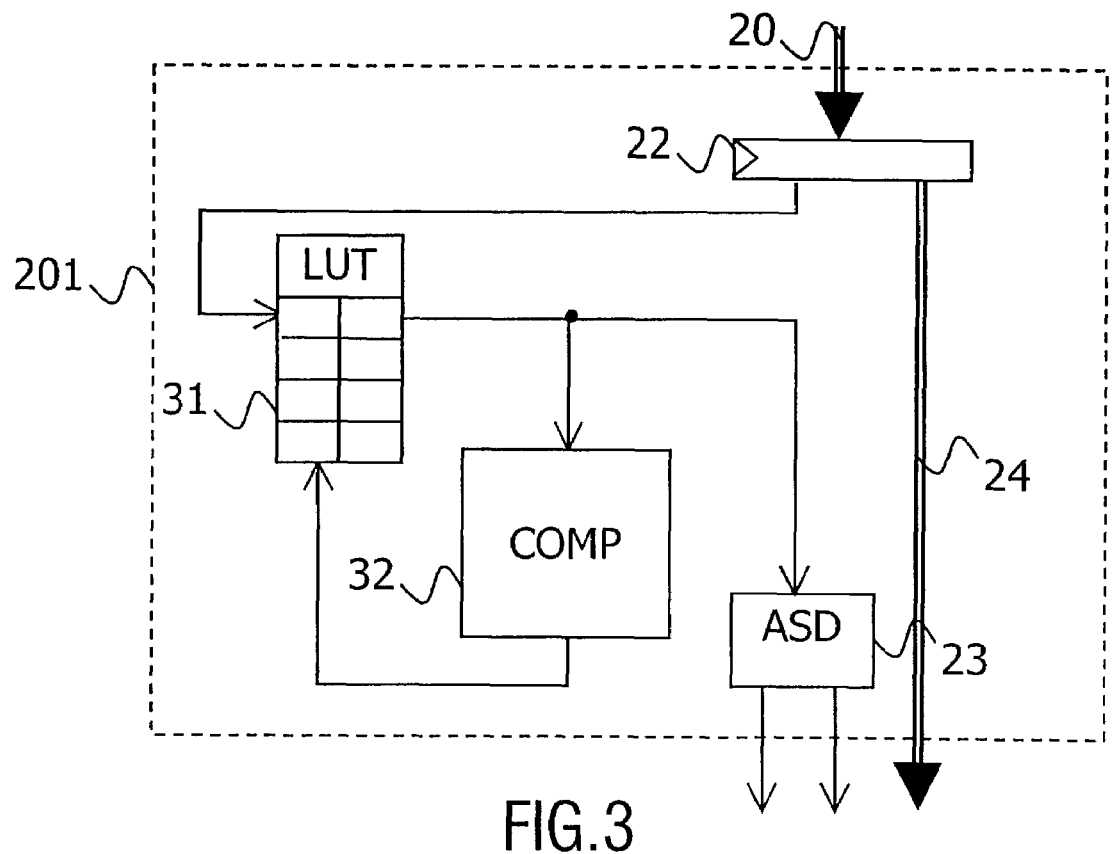
FIG. 3 shows a switching device according to the invention operating in the receiving mode.

FIG. 3 shows a switching device according to the invention, said device operating in the receiving mode. For this purpose, the receiving part (201) shown in FIG. 2 has been modified as follows.

A packet arriving at an input port (20) of the routing device is stored in a register (22). The data in the packet, including at least one parameter from its header, such as the destination node address for example, has been compressed by an entropy coding method predetermined by a designer. The destination node address so coded is transmitted to storage means. In the preferred embodiment, the storage means comprise a look-up table LUT (31). This table is suitable for storing the coded value of the address of the destination node in a first column and the full, i.e. uncoded, value of the address of the destination node that corresponds thereto in a second column. In entropy coding there is one, and only one, full value of the address of the destination code in the table that corresponds to any one coded value of this address. The full value of the address is then transmitted to an address decoder (23) that operates on a principle identical to that described above. This full value is also read by compression means (32). These compression means operate by the predetermined entropy coding method and are suitable for recoding the full value of the address. If the recoded value produced by the entropy coding is different from the coded value present in the table, the recoded value is stored in place of the coded value in the look-up table.

Figure 4:
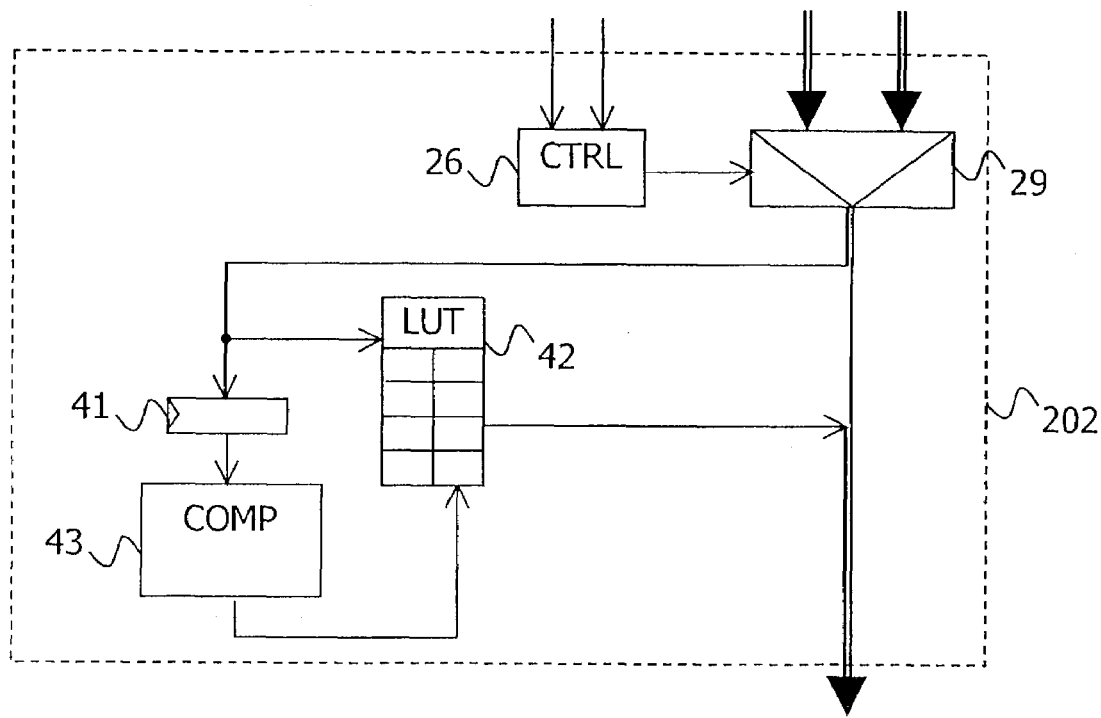
FIG. 4 shows a switching device according to the invention operating in the transmission mode.

FIG. 4 shows a switching device according to the invention that operates in the transmitting mode. For this purpose, the transmitting part (202) shown in FIG. 2 has been modified as follows.

A multiplexer (29) is controlled by a controller CTRL (26) that indicates to it the input that it is to select to transmit data. The switching device comprises a look-up table LUT (42) that is suitable for storing a full value of the address of the destination node in a first column and the value to which it is coded by the predetermined entropy coding method in a second column. It also comprises means (43) for entropy coding compression, which means are suitable for recoding the full value. The look-up table enables the coding of the destination address to be changed as the packets of data move along their paths. If the recoded value produced by the entropy coding is different than the coded value present in the table, the recoded value is stored in place of the coded value after the latter is transmitted. For this purpose a delay circuit (41) enables the full value of the address to be delayed, thus allowing the table not to be altered before the coded value of the address is transmitted by said table along the communication link.

If FIGS. 4 and 3 show the transmitting and receiving parts respectively of the intermediate transmitting (12) and receiving (13) nodes, and since the compression means implement the same entropy coding method and receive the same header parameters, the look-up tables that are controlled by said compression means will contain the same values at any given moment.

The present invention also relates to a method of transmitting data in a communication system comprising devices (11, 12, 13, 14) for routing said data. Said method comprises:

- at a transmitting part of a first routing device (12), a storage step intended for storing a value of at least one parameter from said header and for transmitting a coded value corresponding thereto, and an entropy coding compression step which is intended to recode the uncoded value, the recoded value being stored instead of the coded value after the latter is transmitted along the communication link (15);
- at a receiving part of a second routing device (13) that is connected to the first routing device by the communication link (15), a storage step intended for storing the coded value coming from the communication link (15) and for transmitting the uncoded value corresponding thereto, and an entropy coding compression step which is intended to recode the uncoded value, the recoded value being stored instead of the coded value.

No reference numeral in parentheses in the present text should be interpreted as a limitation. The verb "comprise" and its conjugated forms should also be interpreted in the broad sense, i.e. as not excluding the presence not only of items or steps other that those listed after said verb but also of a plurality of items or steps that are already listed after said verb and are preceded by the word "a" or "an".

The invention claimed is:

1. A data communication system comprising devices for routing data, the devices interconnected by communication links, the data being transmitted in packets and a packet including a header, said system being characterized in that:
    a transmitting part of a first routing device includes first storage means for storing an uncoded value of at least one parameter from said header and for transmitting a coded value corresponding to the uncoded value, and first entropy coding compression means for recoding the uncoded value, the recoded value being stored instead of the coded value after the latter is transmitted along a communication link, and
    a receiving part of a second routing device, the latter being connected to the first routing device by the communication link, includes second storage means for storing the coded value coming from the communication link and for transmitting the uncoded value corresponding thereto, and second entropy coding compression means for recoding the uncoded value, the recoded value being stored instead of the coded value.

2. A communication system as claimed in claim 1, characterized in that the first entropy coding compression means includes a delay circuit for temporarily storing the recoded value while waiting for the corresponding coded value to be transmitted.

3. A routing device for transmitting coded data along a communication link, the data being transmitted in packets and a packet including a header, said device being characterized in that it comprises:
    first storage means for storing an uncoded value of at least one parameter from said header and for transmitting a coded value corresponding to the uncoded value, and
    first entropy coding compression means for recoding the uncoded value, the recoded value being stored instead of the coded value after the latter is transmitted along the communication link.

4. A routing device as claimed in claim 3, characterized in that the first entropy coding compression means includes a delay circuit for temporarily storing the recoded value while waiting for the corresponding coded value to be transmitted.

5. A routing device for receiving coded data via a communication link, the data being transmitted in packets a packet including a header, said device being characterized in that it comprises:
    storage means for storing a value coded by entropy coding of at least one parameter from said header and for transmitting an uncoded value corresponding thereto, and
    entropy coding compression means for recoding the uncoded value, the recoded value being stored instead of the coded value.

6. A method of transmitting data in a communication system comprising devices for routing said data, the data being transmitted in packets and a packet including a header, said method being characterized in that it comprises:
    at a transmitting part of a first routing device, storing an uncoded value of at least one parameter from said header and transmitting a coded value corresponding thereto, and recoding the uncoded value using entropy coding, the recoded value being stored instead of the coded value after the latter is transmitted along a communication link, and
    at a receiving part or a second routing device that is connected to the first routing device by the communication link, storing the coded value coming from the communication link and transmitting the uncoded value corresponding thereto, and recoding the uncoded value using entropy coding, the recoded value being stored instead of the coded value.

* * * * *